(12) United States Patent
Yang

(10) Patent No.: US 11,223,492 B2
(45) Date of Patent: Jan. 11, 2022

(54) WIRELESS COMMUNICATION METHOD AND DEVICE

(71) Applicant: Huawei Technologies Co., Ltd., Shenzhen (CN)

(72) Inventor: Ming Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/710,206

(22) Filed: Dec. 11, 2019

(65) Prior Publication Data

US 2020/0112448 A1 Apr. 9, 2020

Related U.S. Application Data

(63) Continuation of application No. PCT/CN2018/089433, filed on Jun. 1, 2018.

(30) Foreign Application Priority Data

Jun. 12, 2017 (CN) .......................... 201710439611.X

(51) Int. Cl.
*H04L 12/14* (2006.01)
*H04L 29/06* (2006.01)
(Continued)

(52) U.S. Cl.
CPC ...... *H04L 12/1407* (2013.01); *H04L 63/0892* (2013.01); *H04W 8/20* (2013.01); *H04W 12/06* (2013.01)

(58) Field of Classification Search
CPC ...... H04M 15/66; H04M 15/57; H04M 15/74; H04M 7/00; H04L 41/0893;
(Continued)

(56) References Cited

U.S. PATENT DOCUMENTS 8,264,956 B2 * 9/2012 Ramankutty .......... H04L 45/28
370/228
8,693,398 B1 * 4/2014 Chaganti ............. H04L 67/1034
370/328
(Continued)

FOREIGN PATENT DOCUMENTS

CN 101588325 A * 11/2009 ............. H04L 41/00
CN 103516662 A 1/2014
(Continued)

OTHER PUBLICATIONS

Google Patents Translation of CN108259434A, retrieved on Jul. 16, 2021, filed Dec. 29, 2016 (Year: 2016).*
(Continued)

*Primary Examiner* — Matthew C Sams
(74) *Attorney, Agent, or Firm* — Conley Rose, P.C.

(57) ABSTRACT

A wireless communication method includes receiving, by a standby policy and charging control (PCC) function device, an authentication authorization request (AAR) message from an application function (AF), and obtaining, from a standby subscription profile repository based on an internet protocol (IP) address carried in the AAR message, the IP-connectivity access network (CAN) session information corresponding to the AAR message.

18 Claims, 6 Drawing Sheets

(51) Int. Cl.
*H04W 8/20* (2009.01)
*H04W 12/06* (2021.01)

(58) Field of Classification Search
CPC ... H04L 12/1407; H04L 45/025; H04L 45/04; H04L 45/22; H04L 45/28; H04L 63/0892; H04W 24/04; H04W 88/16; H04W 88/14; H04W 8/20; H04W 12/06
See application file for complete search history.

(56) References Cited

U.S. PATENT DOCUMENTS

| | | | |
|---|---|---|---|
| 8,804,494 B1* | 8/2014 | Uberoy | H04L 41/0663 370/219 |
| 2010/0220656 A1* | 9/2010 | Ramankutty | H04L 45/025 370/328 |
| 2012/0221899 A1* | 8/2012 | Cervenak | G06Q 10/10 714/48 |
| 2013/0003529 A1 | 1/2013 | Lopez Nieto et al. | |
| 2015/0236863 A1* | 8/2015 | Castro Castro | H04L 41/0893 370/259 |
| 2015/0271275 A1 | 9/2015 | He et al. | |
| 2015/0312101 A1* | 10/2015 | Siedelhofer | H04M 15/66 370/328 |
| 2017/0026334 A1 | 1/2017 | Youn et al. | |

FOREIGN PATENT DOCUMENTS

| | | | | |
|---|---|---|---|---|
| CN | 104041090 | A | | 9/2014 |
| CN | 104620536 | A | | 5/2015 |
| CN | 106507382 | A | | 3/2017 |
| CN | 106549791 | A | | 3/2017 |
| CN | 106712973 | A | | 5/2017 |
| CN | 108259434 | A | * | 7/2018 |
| EP | 2896156 | A1 | | 7/2015 |
| EP | 2896156 | B1 | * | 11/2016 ............ H04M 15/66 |
| WO | 2011107813 | A1 | | 9/2011 |
| WO | 2012095697 | A1 | | 7/2012 |
| WO | 2014040652 | A1 | | 3/2014 |
| WO | WO-2014040652 | A1 | * | 3/2014 ............ H04M 15/66 |
| WO | 2015167377 | A1 | | 11/2015 |
| WO | WO-2016177224 | A1 | * | 11/2016 ............ H04W 8/00 |

OTHER PUBLICATIONS

Machine Translation and Abstract of Chinese Publication No. CN103516662, Jan. 15, 2014, 11 pages.
Machine Translation and Abstract of Chinese Publication No. CN106507382, Mar. 15, 2017, 30 pages.
Machine Translation and Abstract of Chinese Publication No. CN106549791, Mar. 29, 2017, 16 pages.
Machine Translation and Abstract of Chinese Publication No. CN106712973, dated May 24, 2017, 25 pages.
"3rd Generation Partnership Project; Technical Specification Group Services and System Aspects; Policy and charging control architecture (Release 14)," 3GPP TS 23.203, V14.3.0, Mar. 2017, 256 pages.

* cited by examiner

WIRELESS COMMUNICATION METHOD AND DEVICE

CROSS-REFERENCE TO RELATED APPLICATIONS

This application is a continuation of International Patent Application No. PCT/CN2018/089433 filed on Jun. 1, 2018, which claims priority to Chinese Patent Application No. 201710439611.X filed on Jun. 12, 2017. The disclosures of the aforementioned applications are hereby incorporated by reference in their entireties.

TECHNICAL FIELD

This application relates to the communications field, and in particular, to a wireless communication method and a device.

BACKGROUND

A policy and charging control (PCC) architecture maps a quality of service (QoS) requirement of an application-level session service data flow to a QoS requirement of a transmission network bearer-level service in an internet protocol (IP)-connectivity access network (CAN) to ensure data transmission, and may further implement a charging function at a service data flow level based on a charging policy of an operator.

When user equipment makes a voice call, an application function (AF) device delivers an authentication authorization request (AAR) message to a policy and charging rules function (PCRF) device to request to establish a dedicated bearer. The PCRF receives the AAR message, and binds an application-level session (e.g., AF session) to a corresponding (e.g., IP-CAN) session using an IP address (i.e., Framed-IP-Address) that is carried in the AAR message and that is used by the user equipment to access the internet. The PCRF makes a policy decision based on session information and user subscription information that are carried in the AAR message, generates a QoS rule, delivers a QoS parameter, a gating policy, a trigger, and an authorization rule list to a policy and charging enforcement function (PCEF) device using a re-authorization/re-authentication request/Re-Auth-Request (RAR) message, instructs the PCEF device to establish the dedicated bearer, and guarantees QoS for the voice call of the user equipment. However, in a redundancy networking scenario, when an interface between the AF device and an active PCC function (that is PCRF) is faulty, the AF device sends the AAR message to a standby PCC function (that is another PCRF). Because the standby PCRF does not have an IP-CAN session corresponding to the AAR message, the dedicated bearer cannot be established. This affects user experience.

SUMMARY

This application provides a wireless communication method and a device such that when receiving an AAR message, a standby PCC function device can obtain, from a standby subscription profile repository, IP-CAN session information corresponding to the AAR message, thereby avoiding re-establishment of an IP-CAN session, and improving user experience.

According to a first aspect, this application provides a wireless communication method, including receiving, by a standby PCC function device, an AAR message sent by an AF, and obtaining, from a standby subscription profile repository based on an IP address carried in the AAR message, IP-CAN session information corresponding to the AAR message.

Therefore, in this application, when receiving the AAR message sent by the AF, the standby PCC function device obtains, from the standby subscription profile repository based on the IP address carried in the AAR message, the IP-CAN session information corresponding to the AAR message, thereby avoiding re-establishment of the IP-CAN session, and improving user experience.

Optionally, in an implementation of the first aspect, before obtaining, from a standby subscription profile repository based on an IP address carried in the AAR message, IP-CAN session information corresponding to the AAR message, the method further includes determining, by the standby PCC function device, that an IP-CAN session corresponding to the AAR message does not exist on the standby PCC function device.

Optionally, in an implementation of the first aspect, after obtaining, from a standby subscription profile repository based on an IP address carried in the AAR message, IP-CAN session information corresponding to the AAR message, the method further includes obtaining, by the standby PCC function device from the standby subscription profile repository, subscription information of user equipment corresponding to the IP address, determining a QoS control rule based on the AAR message and the subscription information of the user equipment, determining a PCEF device based on the IP-CAN session information, and sending an RAR message to the determined PCEF device, where the RAR message includes the QoS control rule and an identifier of the PCC function device.

In this case, the PCEF device is determined using the IP-CAN session information, and the RAR message is sent to the determined PCEF device such that the PCEF device establishes a dedicated bearer.

Optionally, in an implementation of the first aspect, when the AAR message is a service update message, the method further includes obtaining, from the standby subscription profile repository based on the IP address carried in the AAR message, AF session information corresponding to the AAR message.

In this case, the AF session information corresponding to the AAR message is obtained from the standby subscription profile repository in order to update and release the AF session.

Optionally, in an implementation of the first aspect, before obtaining, from a standby subscription profile repository based on an IP address carried in the AAR message, IP-CAN session information corresponding to the AAR message, the method further includes determining, by the standby PCC function device, that a link between the active PCC function device and the standby PCC function device is abnormal, and/or a link between the active PCC function device and the PCEF device is abnormal.

Optionally, in an implementation of the first aspect, before determining, by the standby PCC function device, that a link between the active PCC function device and the standby PCC function device is abnormal, and/or a link between the active PCC function device and the PCEF device is abnormal, the method further includes establishing, by the standby PCC function device, a diameter link between the standby PCC function device and the active PCC function device.

According to a second aspect, this application provides a wireless communication method, including receiving, by a standby PCC function device, an AAR message sent by an AF, obtaining a status of a link between an active PCC function device and the standby PCC function device and a status of a link between the active PCC function device and a PCEF device, and determining, based on the status of the link between the active PCC function device and the standby PCC function device and the status of the link between the active PCC function device and the PCEF device, whether to send the AAR message to the active PCC function device.

Therefore, in this application, when receiving the AAR message sent by the AF, the standby PCC function device obtains the status of the link between the active PCC function device and the standby PCC function device and the status of the link between the active PCC function device and the PCEF device to determine whether to send the AAR message to the active PCC function device, thereby avoiding re-establishment of an IP-CAN session by the standby PCC function device, and improving user experience.

Optionally, in an implementation of the second aspect, obtaining a status of a link between an active PCC function device and the standby PCC function device and a status of a link between the active PCC function device and a PCEF device includes obtaining, from a standby subscription profile repository, the status of the link between the active PCC function device and the standby PCC function device and the status of the link between the active PCC function device and the PCEF device.

Optionally, in an implementation of the second aspect, before receiving, by a standby PCC function device, an AAR message sent by an AF, the method further includes establishing, by the standby PCC function device, a diameter link between the standby PCC function device and the active PCC function device.

Optionally, in an implementation of the second aspect, determining, based on the obtained status of the link between the active PCC function device and the standby PCC function device and the obtained status of the link between the active PCC function device and the PCEF device, whether to send the AAR message to the active PCC function device includes, when the link between the active PCC function device and the standby PCC function device is normal, and the link between the active PCC function device and the PCEF device is normal, determining to send the AAR message to the active PCC function device, or when the link between the active PCC function device and the standby PCC function device is abnormal, and/or the link between the active PCC function device and the PCEF device is abnormal, skipping sending the AAR message to the active PCC function device.

In this case, when the link between the active PCC function device and the standby PCC function device is normal, and the link between the active PCC function device and the PCEF device is normal, it is determined to send the AAR message to the active PCC function device such that the active PCC function device sends an RAR message to the PCEF device, thereby avoiding a case in which identification information of the standby PCC function device also needs to be carried when the standby PCC function device sends the RAR message to the PCEF device, and reducing signaling overheads.

Optionally, in an implementation of the second aspect, when the link between the active PCC function device and the standby PCC function device is abnormal, and/or the link between the active PCC function device and the PCEF device is abnormal, the AAR message is not sent to the active PCC function device. In this case, the method further includes, when the standby PCC function device determines that the IP-CAN session corresponding to the AAR message does not exist on the standby PCC function device, obtaining, from the standby subscription profile repository based on an IP address carried in the AAR message, IP-CAN session information corresponding to the AAR message.

In this case, when the link between the active PCC function device and the standby PCC function device is abnormal, and/or the link between the active PCC function device and the PCEF device is abnormal, the IP-CAN session information corresponding to the AAR message is obtained from the standby subscription profile repository, thereby avoiding re-establishment of an IP-CAN session, and improving user experience.

Optionally, in an implementation of the second aspect, after obtaining, from the standby subscription profile repository based on an IP address carried in the AAR message, IP-CAN session information corresponding to the AAR message, the method further includes obtaining, by the standby PCC function device, subscription information of user equipment corresponding to the IP address, determining a QoS control rule based on the AAR message and the subscription information of the user equipment, determining the PCEF device based on the IP-CAN session information, and sending an RAR message to the determined PCEF device, where the RAR message includes the QoS control rule and an identifier of the PCC function device.

In this case, the PCEF device is determined using the IP-CAN session information, and the RAR message is sent to the determined PCEF device such that the PCEF device establishes a dedicated bearer.

Optionally, in an implementation of the second aspect, when the AAR message is a service update message, the method further includes obtaining, from the standby subscription profile repository based on the IP address carried in the AAR message, AF session information corresponding to the AAR message.

In this case, the AF session information corresponding to the AAR message is obtained from the standby subscription profile repository in order to update and release the AF session.

According to a third aspect, this application provides a wireless communication method, including establishing, by an active PCC function device, an AF session and/or an IP-CAN session corresponding to the user equipment, and storing, by the active PCC function device, the AF session information and/or the IP-CAN session information in an active subscription profile repository.

Optionally, in an implementation of the third aspect, the method further includes receiving, by the active PCC function device, an AAR message sent by the standby PCC function device, obtaining subscription information of the user equipment corresponding to the IP address, determining a QoS control rule based on the AAR message and the subscription information of the user equipment, determining a PCEF device based on the IP-CAN session, and sending an RAR message to the PCEF device, where the RAR message includes the QoS control rule.

Optionally, in an implementation of the third aspect, before the receiving, by the active PCC function device, an AAR message sent by the standby PCC function device, the method further includes establishing, by the active PCC function device, a diameter link between the active PCC function device and the standby PCC function device.

According to a fourth aspect, this application provides a wireless communication method, including receiving, by an active PCC function device, an AAR message sent by a standby PCC function device, obtaining, based on an IP address carried in the AAR message, subscription information of user equipment corresponding to the IP address, determining a QoS control rule based on the AAR message and the subscription information of the user equipment, determining a PCEF device based on the IP-CAN session, and sending an RAR message to the PCEF device, where the RAR message includes the QoS control rule.

Optionally, in an implementation of the fourth aspect, before receiving, by an active PCC function device, an AAR message sent by a standby PCC function device, the method further includes establishing, by the active PCC function device, a diameter link between the active PCC function device and the standby PCC function device.

According to a fifth aspect, this application provides a wireless communication method, including receiving, by an active subscription profile repository, AF session information and/or IP-CAN session information sent by an active PCC function device, and sending the AF session information and/or the IP-CAN session information to a standby subscription profile repository.

Optionally, in an implementation of the fifth aspect, the standby subscription profile repository receives the AF session information and/or the IP-CAN session information sent by the active subscription profile repository, and stores the AF session information and/or the IP-CAN session information.

According to a sixth aspect, this application provides a wireless communication method, including receiving a request message sent by a standby PCC function device, where the request message is used to request AF session information and IP-CAN session information that are corresponding to user equipment, or request IP-CAN session information corresponding to user equipment, and sending, to the standby PCC function device, the AF session information and the IP-CAN session information that are corresponding to the user equipment, or the IP-CAN session information corresponding to the user equipment.

According to a seventh aspect, a standby PCC function device is provided, including a receiving module and an obtaining module, and can perform the method according to any one of the first aspect or the optional implementations of the first aspect.

According to an eighth aspect, a standby PCC function device is provided, including a receiving module, a determining module, and an obtaining module, and can perform the method according to any one of the second aspect or the optional implementations of the second aspect.

According to a ninth aspect, an active PCC function device is provided, including a processing module and a storage module, and can perform the method according to any one of the third aspect or the optional implementations of the third aspect.

According to a tenth aspect, an active PCC function device is provided, including a receiving module, a storage module, and a determining module, and can perform the method according to any one of the fourth aspect or the optional implementations of the fourth aspect.

According to an eleventh aspect, an active PCC function device is provided, including a processing module and a storage module, and can perform the method according to any one of the fifth aspect or the optional implementations of the fifth aspect.

According to a twelfth aspect, a standby subscription profile repository is provided, including a receiving module and a sending module, and can perform the method according to any one of the sixth aspect or the optional implementations of the sixth aspect.

According to a thirteenth aspect, a standby PCC function device is provided, including hardware such as a memory, a transceiver, and a processor. The memory stores program code that may be used to instruct to perform any one of the first aspect or the optional implementations of the first aspect or program code that may be used to instruct to perform any one of the second aspect or the optional implementations of the second aspect. The transceiver is configured to perform specific signal transmitting and receiving while driven by the processor. When the code is executed, the processor may implement operations performed by the standby PCC function device in the method.

According to a fourteenth aspect, an active PCC function device is provided, including a memory, a transceiver, and a processor. The memory stores program code that may be used to instruct to perform any one of the third aspect or the optional implementations of the third aspect or program code that may be used to instruct to perform any one of the fourth aspect or the optional implementations of the fourth aspect. The transceiver is configured to perform specific signal transmitting and receiving while driven by the processor. When the code is executed, the processor may implement operations performed by the active PCC function device in the method.

According to a fifteenth aspect, an active subscription profile repository is provided, including a memory, a transceiver, and a processor. The memory stores program code that may be used to instruct to perform any one of the fifth aspect or the optional implementations of the fifth aspect. The transceiver is configured to perform specific signal transmitting and receiving while driven by the processor. When the code is executed, the processor may implement operations performed by the active subscription profile repository in the method.

According to a sixteenth aspect, a standby subscription profile repository is provided, including a memory, a transceiver, and a processor. The memory stores program code that may be used to instruct to perform any one of the sixth aspect or the optional implementations of the sixth aspect. The transceiver is configured to perform specific signal transmitting and receiving while driven by the processor. When the code is executed, the processor may implement operations performed by the standby subscription profile repository in the method.

According to a seventeenth aspect, a computer storage medium is provided. The computer storage medium stores program code. The program code may be used to instruct to perform the method according to any one of the first aspect or the optional implementations of the first aspect, the method according to any one of the second aspect or the optional implementations of the second aspect, the method according to any one of the third aspect or the optional implementations of the third aspect, the method according to any one of the fourth aspect or the optional implementations of the fourth aspect, the method according to any one of the fifth aspect or the optional implementations of the fifth aspect, or the method according to any one of the sixth aspect or the optional implementations of the sixth aspect.

DESCRIPTION OF EMBODIMENTS

The following describes technical solutions of this application with reference to accompanying drawings.

Figure 1:
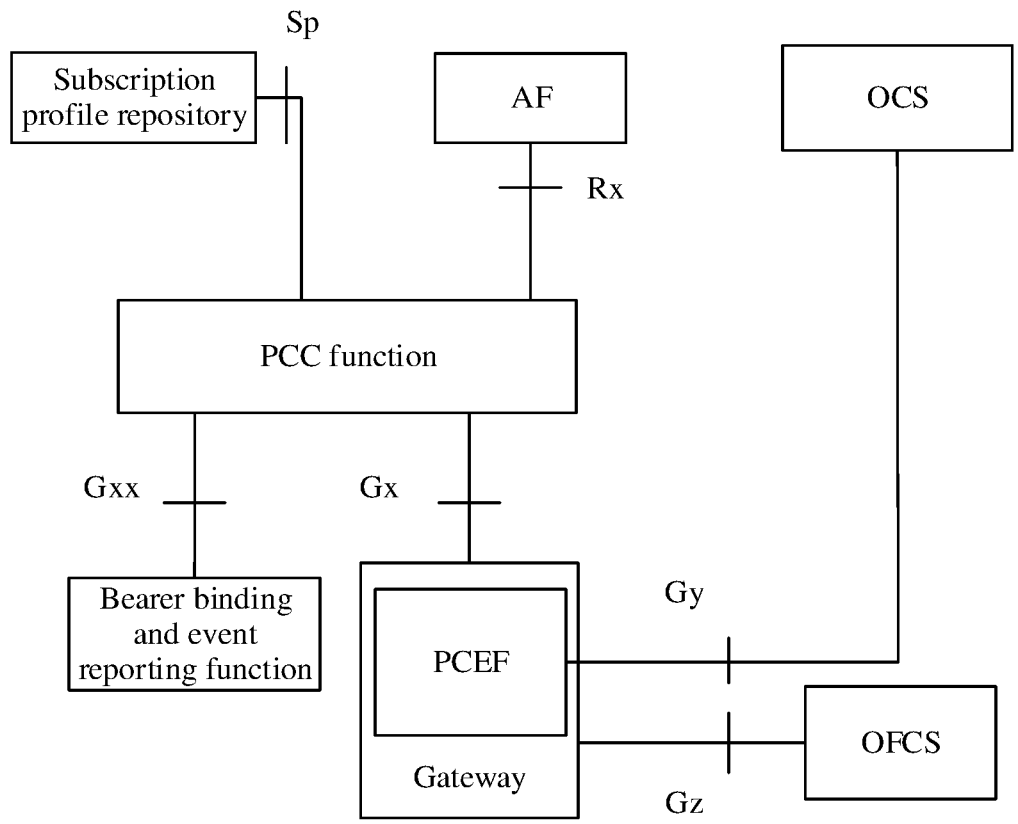
FIG. 1 is a logical architecture diagram of a PCC architecture according to this application.

FIG. 1 is a logical architecture diagram of a PCC architecture. The PCC architecture is an architecture proposed by the 3rd generation partnership project (3GPP) organization after policy control and flow-based charging are integrated. The PCC architecture may map a QoS requirement of an application-level session service data flow to a QoS requirement for access of an IP-CAN to a bearer-level service in a transmission network to ensure data transmission, and may further implement a charging function at a service data flow level based on a charging policy of an operator. The PCC architecture mainly includes functional entities such as a PCRF, a PECF, an AF, a subscription profile repository (also referred to as SPR), an online charging system (OCS), and an offline charging system (OFCS).

PCC function (also referred to as PCRF): The function entity includes a policy control decision function and a flow-based charging control function. The PCRF receives input from the PCEF, the SPR, and the AF, and provides the PCEF with a network control function regarding service data flow detection, gating, and QoS and flow-based charging (except credit control). A PCC decision is made based on customized information of the PCRF.

PCEF: The function entity mainly includes functions such as service data flow detection, policy enforcement, and flow-based charging, and is located on a gateway, for example, a gateway general packet radio services (GPRS) support node (GGSN) gateway of a GPRS, a packet data network (PDN) gateway (P-GW) in an evolved packet core (EPC), a packet data gateway (PDG) in a wireless local area network (WLAN), or may be independently deployed.

AF: The function entity is a unit that provides application services, and mainly performs dynamic policy/charging control on an IP-CAN user plane behavior. These services need dynamic PCC. The AF transfers, using an Rx reference point (refer FIG. 1), dynamic session information required by the PCRF, and receives specified information of the IP-CAN and acknowledgement of an event at a bearer layer of the IP-CAN.

Subscription profile repository: The subscription profile storage repository includes information about all subscribers or subscriptions. Subscription information provided by the SPR includes (for each PDN), a service allowed by a subscriber, a priority of each allowed service (optional), QoS information allowed by a subscriber, charging-related information of a subscriber service, for example, an access type, location information, and a quantity of use times, a subscriber type, and the like. The SPR may be associated with a plurality of databases distributed in an operator network. The SPR interacts with the PCRF using an Sp reference point (refer FIG. 1).

OCS: The function entity provides a credit control function based on a user and a service data flow. The online charging system mainly includes modules such as an online collection module, a charging control module, a rating module, and a balance management module in order to implement an online charging function, and cooperates with another charging network element device (a device, for example, a service control point (SCP), a computer communications group (CCG), and an inter-system mobility policy (ISMP), that triggers a session-based or event-based online charging event request) to perform real-time traffic control.

OFCS: The function entity provides a charging function based on a user and a service data flow, and includes main functions such as a customer service, service management, charging, settlement, accounting processing, and system management. The offline charging system is a postpaid processing system for a bill and an account.

In the PCC architecture, when user equipment makes a voice service (e.g., voice over long term evolution (VoLTE)) call, the AF delivers an AAR message to the PCRF to request to establish a dedicated bearer. The PCRF receives the AAR message and binds an AF session to a corresponding IP-CAN session using a user IP address (i.e., Framed-IP-Address) carried in the AAR message. The PCRF makes a policy decision based on session information (for example, a media stream type, and an IP multimedia subsystem (IMS) application layer charging identifier) and user subscription information that are carried in the AAR message, generates a QoS rule, delivers a QoS parameter, a gating policy, a trigger, and an authorization rule list to the PCEF using an RAR message, instructs the PCEF to establish the dedicated bearer, and guarantees QoS for the call.

To better understand this application, this application is described below with reference to FIG. 2 to FIG. 14 using a system the same as or similar to the system shown in FIG. 1 as an example.

Figure 2:
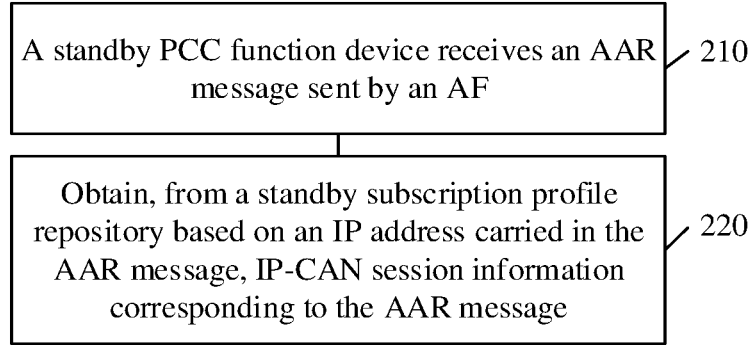
FIG. 2 is a schematic flowchart of a wireless communication method according to this application.

FIG. 2 is a schematic flowchart of a wireless communication method 200 according to this application. As shown in FIG. 2, the method 200 includes the following content.

Step 210. A standby PCC function device receives an AAR message sent by an AF.

It should be understood that the AAR message is an AA-Request, that is, an AAR, or may be an Rx interface message. The AAR message carries information such as an application identifier, a media type, a media stream status, and an IMS application layer charging identifier.

Step 220. Obtain, from a standby subscription profile repository based on an IP address carried in the AAR message, IP-CAN session information corresponding to the AAR message.

Optionally, before obtaining, from a standby subscription profile repository based on an IP address carried in the AAR message, IP-CAN session information corresponding to the AAR message, the method 200 further includes determining, by the standby PCC function device, that an IP-CAN session corresponding to the AAR message does not exist on the standby PCC function device.

Further, when receiving the AAR message, the standby PCC function device first determines whether the IP-CAN session corresponding to the AAR message exists on the standby PCC function device. If the IP-CAN session corresponding to the AAR message does not exist on the standby PCC function device, the standby PCC function device obtains, from the standby subscription profile repository, the IP-CAN session information corresponding to the AAR message.

It should be understood that the standby PCRF and the standby SPR may be deployed separately on different network elements, or may be deployed on a same network element. A deployment structure of the standby PCRF and the standby SPR is not limited in this application.

Optionally, after obtaining, from a standby subscription profile repository based on an IP address carried in the AAR message, IP-CAN session information corresponding to the AAR message, the method 200 further includes obtaining, by the standby PCC function device from the standby subscription profile repository, subscription information of user equipment corresponding to the IP address, determining a QoS control rule based on the AAR message and the subscription information of the user equipment, determining a PCEF device based on the IP-CAN session information, and sending an RAR message to the determined PCEF device, where the RAR message includes the QoS control rule and an identifier of the PCC function device.

It should be understood that the RAR message is a re-auth-request, and is used to re-authenticate or re-authorize the user equipment.

Further, after obtaining, from the standby SPR, the IP-CAN session information corresponding to the AAR message, the standby PCRF obtains, from the standby SPR, the subscription information of the user equipment corresponding to the IP address carried in the AAR message, determines the QoS control rule based on a service requested using the AAR message and the subscription information of the user equipment, and delivers a QoS parameter, a gating policy, a trigger, and an authorization rule list to the PCEF using the RAR message.

Optionally, when the AAR message is a service update message, the method 200 further includes obtaining, from the standby subscription profile repository based on the IP address carried in the AAR message, AF session information corresponding to the AAR message.

Further, when the AAR message is used to request to update a service, the AF session corresponding to the AAR message is already established, and the standby PCC function device obtains, from the standby SPR, the AF session corresponding to the AAR message.

Optionally, before obtaining, from a standby subscription profile repository based on an IP address carried in the AAR message, IP-CAN session information corresponding to the AAR message, the method 200 further includes determining, by the standby PCC function device, that a link between the active PCC function device and the standby PCC function device is abnormal, and/or a link between the active PCC function device and the PCEF is abnormal.

Optionally, before determining, by the standby PCC function device, that a link between the active PCC function device and the standby PCC function device is abnormal, and/or a link between the active PCC function device and the PCEF is abnormal, the method 200 further includes establishing, by the standby PCC function device, a diameter link between the standby PCC function device and the active PCC function device.

Therefore, in this application, when receiving the AAR message sent by the AF, the standby PCC function device obtains, from the standby subscription profile repository based on the IP address carried in the AAR message, the IP-CAN session information corresponding to the AAR message, thereby avoiding re-establishment of the IP-CAN session, and improving user experience.

Figure 3:
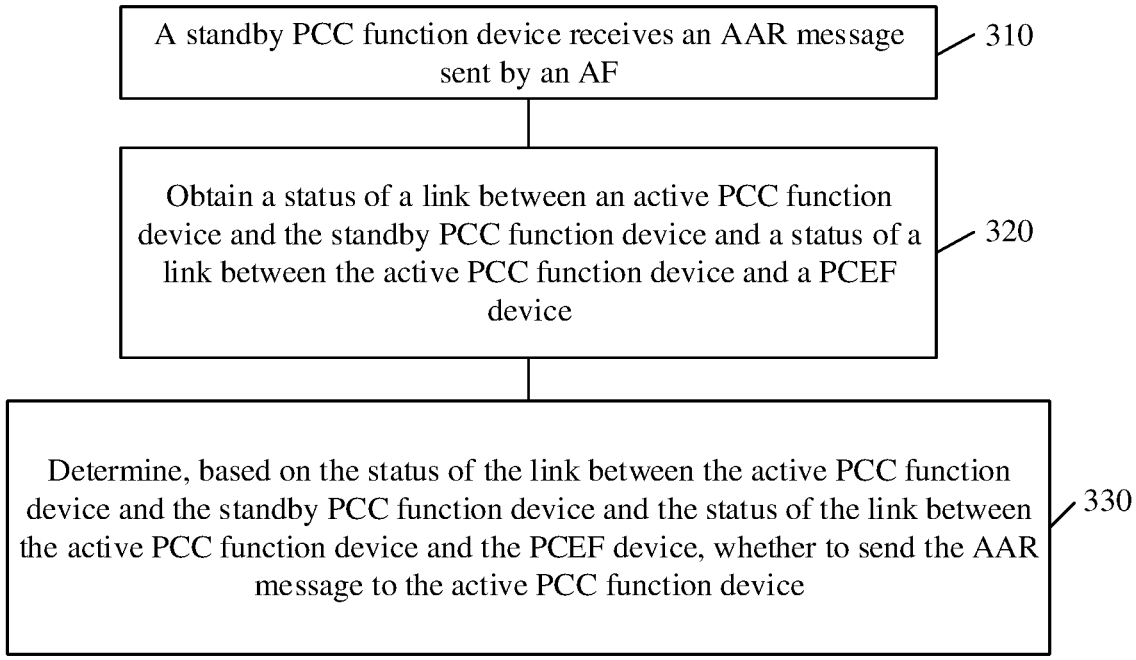
FIG. 3 is a schematic flowchart of a wireless communication method according to this application.

FIG. 3 is a schematic flowchart of a wireless communication method 300 according to this application. As shown in FIG. 3, the wireless communication method 300 includes the following content.

Step 310. A standby PCC function device receives an AAR message sent by an AF.

It should be understood that the AAR message is an AA-Request, that is, an AAR, or may be an Rx interface message. The AAR message carries information such as an application identifier, a media type, a media stream status, and an IMS application layer charging identifier.

Step 320. Obtain a status of a link between an active PCC function device and the standby PCC function device and a status of a link between the active PCC function device and a PCEF device.

Optionally, before obtaining a status of a link between an active PCC function device and the standby PCC function device and a status of a link between the active PCC function device and a PCEF device, the method 300 further includes determining, by the standby PCC function device, that an IP-CAN session corresponding to the AAR message does not exist on the standby PCC function device.

Further, when receiving the AAR message, the standby PCC function device first determines whether the IP-CAN session corresponding to the AAR message exists on the standby PCC function device. If the IP-CAN session corresponding to the AAR message does not exist on the standby PCC function device, the standby PCC function device obtains the status of the link between the active PCC function device and the standby PCC function device and the status of the link between the active PCC function device and the PCEF device.

Optionally, obtaining a status of a link between an active PCC function device and the standby PCC function device and a status of a link between the active PCC function device and a PCEF device includes obtaining, from a standby subscription profile repository, the status of the link between the active PCC function device and the standby PCC function device and the status of the link between the active PCC function device and the PCEF device.

It should be understood that the standby PCRF and the standby SPR may be deployed separately on different network elements, or may be deployed on a same network element. A deployment structure of the standby PCRF and the standby SPR is not limited in this application.

Step 330. Determine, based on the status of the link between the active PCC function device and the standby PCC function device and the status of the link between the active PCC function device and the PCEF device, whether to send the AAR message to the active PCC function device.

Optionally, before receiving, by a standby PCC function device, an AAR message sent by an AF, the method 300 further includes establishing, by the standby PCC function device, a diameter link between the standby PCC function device and the active PCC function device.

Optionally, determining, based on the obtained status of the link between the active PCC function device and the standby PCC function device and the obtained status of the link between the active PCC function device and the PCEF device, whether to send the AAR message to the active PCC function device includes, when the link between the active PCC function device and the standby PCC function device is normal, and the link between the active PCC function device and the PCEF is normal, determining to send the AAR message to the active PCC function device, or when the link between the active PCC function device and the standby PCC function device is abnormal, and/or the link between the active PCC function device and the PCEF is abnormal, skipping sending the AAR message to the active PCC function device.

Optionally, when the link between the active PCC function device and the standby PCC function device is abnormal, and/or the link between the active PCC function device and the PCEF is abnormal, the AAR message is not sent to the active PCC function device. In this case, the method 300 further includes, when the standby PCC function device determines that the IP-CAN session corresponding to the AAR message does not exist on the standby PCC function device, obtaining, from the standby subscription profile repository based on an IP address carried in the AAR message, IP-CAN session information corresponding to the AAR message.

Optionally, after obtaining, from the standby subscription profile repository based on an IP address carried in the AAR message, IP-CAN session information corresponding to the AAR message, the method 300 further includes obtaining, by the standby PCC function device, subscription information of user equipment corresponding to the IP address, determining a QoS control rule based on the AAR message and the subscription information of the user equipment, determining the PCEF device based on the IP-CAN session information, and sending an RAR message to the determined PCEF device, where the RAR message includes the QoS control rule and an identifier of the PCC function device.

Optionally, when the AAR message is a service update message, the method 300 further includes obtaining, from the standby subscription profile repository based on the IP address carried in the AAR message, AF session information corresponding to the AAR message.

Therefore, in this application, when receiving the AAR message sent by the AF, the standby PCC function device obtains the status of the link between the active PCC function device and the standby PCC function device and the status of the link between the active PCC function device and the PCEF device to determine whether to send the AAR message to the active PCC function device, thereby avoiding re-establishment of an IP-CAN session by the standby PCC function device, and improving user experience.

Figure 4:
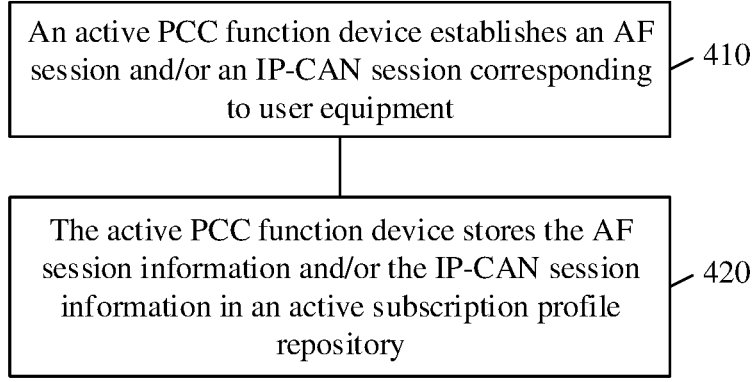
FIG. 4 is a schematic flowchart of a wireless communication method according to this application.

FIG. 4 is a schematic flowchart of a wireless communication method 400 according to this application. As shown in FIG. 4, the wireless communication method 400 includes the following content.

Step 410. An active PCC function device establishes an AF session and/or an IP-CAN session corresponding to user equipment.

Step 420. The active PCC function device stores the AF session information and/or the IP-CAN session information in an active subscription profile repository.

It should be understood that the active PCRF and the active SPR may be deployed separately on different network elements, or may be deployed on a same network element. A deployment structure of the active PCRF and the active SPR is not limited in this application.

Optionally, the method 400 further includes receiving, by the active PCC function device, an AAR message sent by the standby PCC function device, obtaining subscription information of the user equipment corresponding to the IP address, determining a QoS control rule based on the AAR message and the subscription information of the user equipment, determining a PCEF device based on the IP-CAN session, and sending an RAR message to the PCEF device, where the RAR message includes the QoS control rule.

Optionally, before receiving, by the active PCC function device, an AAR message sent by the standby PCC function device, the method 400 further includes establishing, by the active PCC function device, a diameter link between the active PCC function device and the standby PCC function device.

Figure 5:
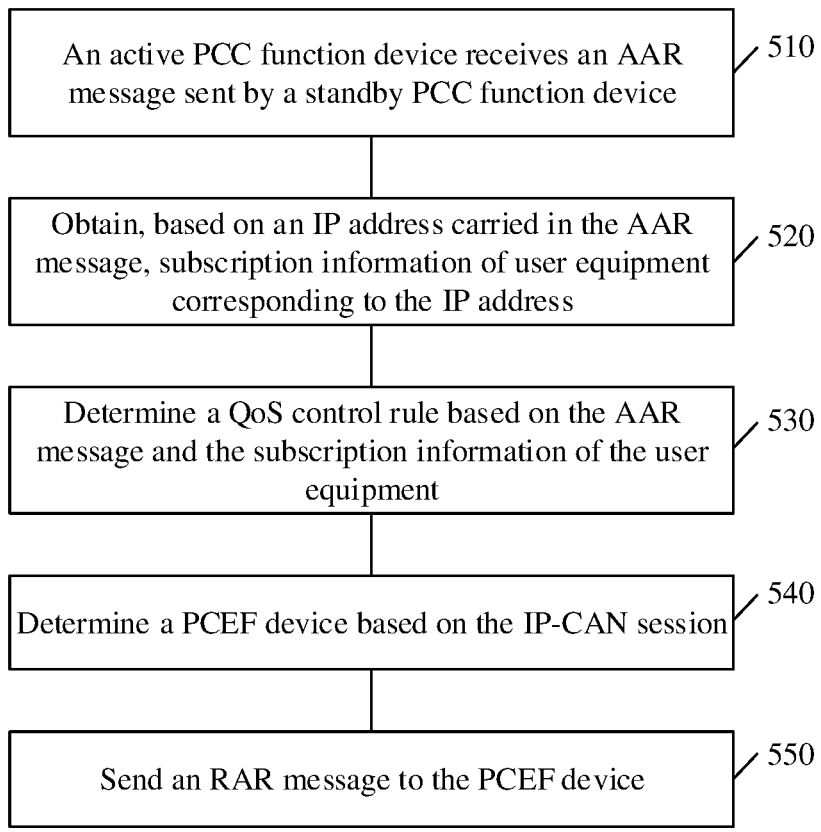
FIG. 5 is a schematic flowchart of a wireless communication method according to this application.

FIG. 5 is a schematic flowchart of a wireless communication method 500 according to this application. As shown in FIG. 5, the wireless communication method 500 includes the following content.

Step 510. An active PCC function device receives an AAR message sent by a standby PCC function device.

Step 520. Obtain, based on an IP address carried in the AAR message, subscription information of user equipment corresponding to the IP address.

Step 530. Determine a QoS control rule based on the AAR message and the subscription information of the user equipment.

Step 540. Determine a PCEF device based on the IP-CAN session.

Step 550. Send an RAR message to the PCEF device, where the RAR message includes the QoS control rule.

Optionally, before receiving, by an active PCC function device, an AAR message sent by a standby PCC function device, the method 500 further includes establishing, by the active PCC function device, a diameter link between the active PCC function device and the standby PCC function device.

Figure 6:
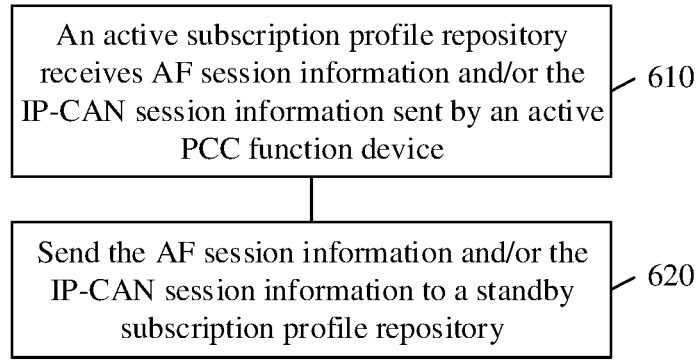
FIG. 6 is a schematic flowchart of a wireless communication method according to this application.

FIG. 6 is a schematic flowchart of a wireless communication method 600 according to this application. As shown in FIG. 6, the wireless communication method 600 includes the following content.

Step 610. An active subscription profile repository receives AF session information and/or the IP-CAN session information sent by an active PCC function device.

Step 620. Send the AF session information and/or the IP-CAN session information to a standby subscription profile repository.

Figure 7:
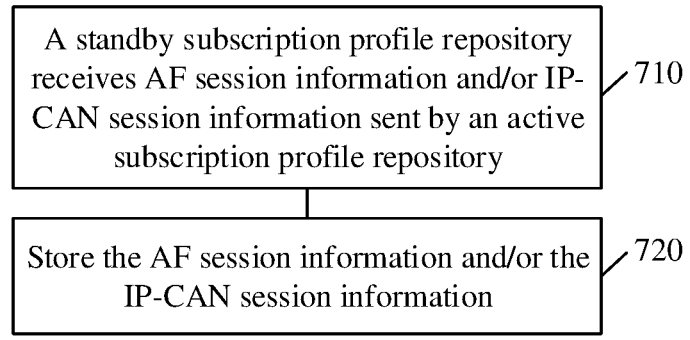
FIG. 7 is a schematic flowchart of a wireless communication method according to this application.

FIG. 7 is a schematic flowchart of a wireless communication method 700 according to this application. As shown in FIG. 7, the wireless communication method 700 includes the following content.

Step 710. A standby subscription profile repository receives AF session information and/or IP-CAN session information sent by an active subscription profile repository.

Step 720. Store the AF session information and/or the IP-CAN session information.

Optionally, the method 700 further includes receiving a request message sent by a standby PCC function device, where the request message is used to request the AF session information and the IP-CAN session information that are corresponding to user equipment, or request the IP-CAN session information corresponding to user equipment, and sending, to the standby PCC function device, the AF session information and the IP-CAN session information that are corresponding to the user equipment, or the IP-CAN session information corresponding to the user equipment.

Figure 8:
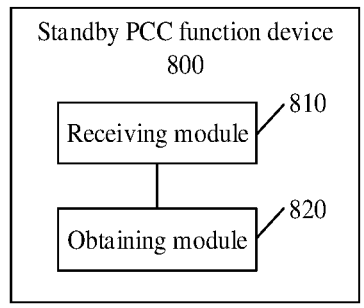
FIG. 8 is a schematic block diagram of a standby PCC function device according to this application.

FIG. 8 is a schematic block diagram of a standby PCC function device 800 according to this application. As shown in FIG. 8, the standby PCC function device 800 includes a receiving module 810 configured to receive an AAR message sent by an AF, and an obtaining module 820 configured to obtain, from a standby subscription profile repository based on an IP address carried in the AAR message, IP-CAN session information corresponding to the AAR message.

Optionally, the receiving module 810 and the obtaining module 820 are configured to perform operations in the wireless communication method 200 in this application. For brevity, details are not described herein again.

Figure 9:
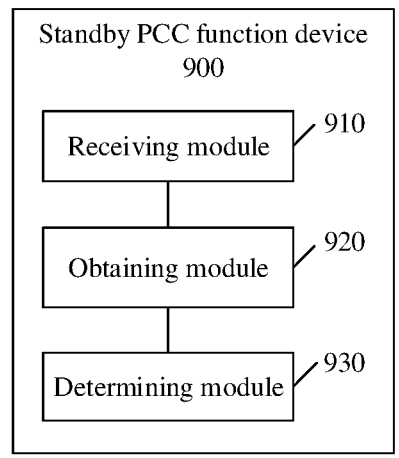
FIG. 9 is a schematic block diagram of a standby PCC function device according to this application.

FIG. 9 is a schematic block diagram of a standby PCC function device 900 according to this application. As shown in FIG. 9, the standby PCC function device 900 includes a receiving module 910 configured to receive an AAR message sent by an AF, an obtaining module 920 configured to obtain a status of a link between an active PCC function device and the standby PCC function device and a status of a link between the active PCC function device and a PCEF device, and a determining module 930 configured to determine, based on the status of the link between the active PCC function device and the standby PCC function device and the status of the link between the active PCC function device and the PCEF device, whether to send the AAR message to the active PCC function device.

Optionally, the receiving module 910, the obtaining module 920, and the determining module 930 are configured to perform operations in the wireless communication method 300 in this application. For brevity, details are not described herein again.

Figure 10:
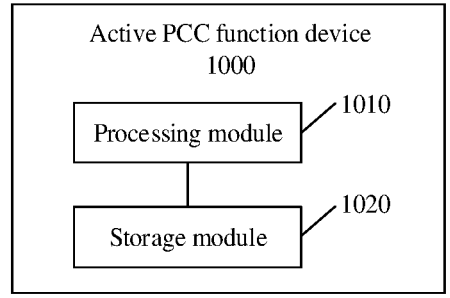
FIG. 10 is a schematic block diagram of an active PCC function device according to this application.

FIG. 10 is a schematic block diagram of an active PCC function device 1000 according to this application. As shown in FIG. 10, the active PCC function device 1000 includes a processing module 1010 configured to establish an AF session and/or an IP-CAN session corresponding to the user equipment, and a storage module 1020 configured to store the AF session information and/or the IP-CAN session information in an active subscription profile repository.

Optionally, the processing module 1010 and the storage module 1020 are configured to perform operations in the wireless communication method 400 in this application. For brevity, details are not described herein again.

Figure 11:
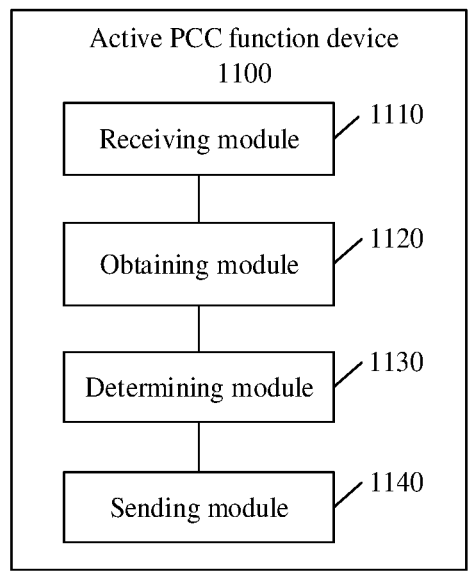
FIG. 11 is a schematic block diagram of an active PCC function device according to this application.

FIG. 11 is a schematic block diagram of an active PCC function device 1100 according to this application. As shown in FIG. 11, the active PCC function device 1100 includes a receiving module 1110 configured to receive an AAR message sent by a standby PCC function device, an obtaining module 1120 configured to obtain, based on an IP address carried in the AAR message, subscription information of user equipment corresponding to the IP address, a determining module 1130 configured to determine a QoS control rule based on the AAR message and the subscription information of the user equipment, where the determining module 1130 is further configured to determine a PCEF device based on the IP-CAN session, and a sending module 1140 configured to send an RAR message to the PCEF device, where the RAR message includes the QoS control rule.

Optionally, the receiving module 1110, the obtaining module 1120, the determining module 1130, and the sending module 1140 are configured to perform operations in the wireless communication method 500 in this application. For brevity, details are not described herein again.

Figure 12:
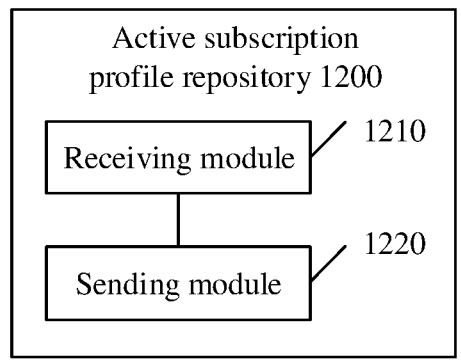
FIG. 12 is a schematic block diagram of an active subscription profile repository according to this application.

FIG. 12 is a schematic block diagram of an active subscription profile repository 1200 according to this application. As shown in FIG. 12, the active subscription profile repository 1200 includes a receiving module 1210 configured to receive AF session information and/or the IP-CAN session information sent by an active PCC function device, and a sending module 1220 configured to send the AF session information and/or the IP-CAN session information to a standby subscription profile repository.

Optionally, the receiving module 1210 and the sending module 1220 are configured to perform operations in the wireless communication method 600 in this application. For brevity, details are not described herein again.

Figure 13:
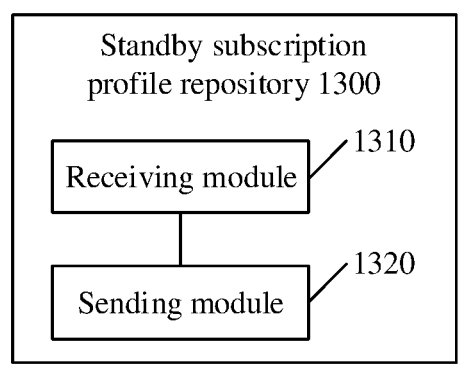
FIG. 13 is a schematic block diagram of a standby subscription profile repository according to this application.

FIG. 13 is a schematic block diagram of a standby subscription profile repository 1300 according to this application. As shown in FIG. 13, the standby subscription profile repository 1300 includes a receiving module 1310 configured to receive a request message sent by a standby PCC function device, where the request message is used to request AF session information and IP-CAN session information that are corresponding to user equipment, or IP-CAN session information corresponding to user equipment, and a sending module 1320 configured to send, to the standby PCC function device, the AF session information and the IP-CAN session information that are corresponding to the user equipment, or the IP-CAN session information corresponding to the user equipment.

Optionally, the receiving module 1310 and the sending module 1320 are configured to perform operations in the wireless communication method 700 in this application. For brevity, details are not described herein again.

Figure 14:
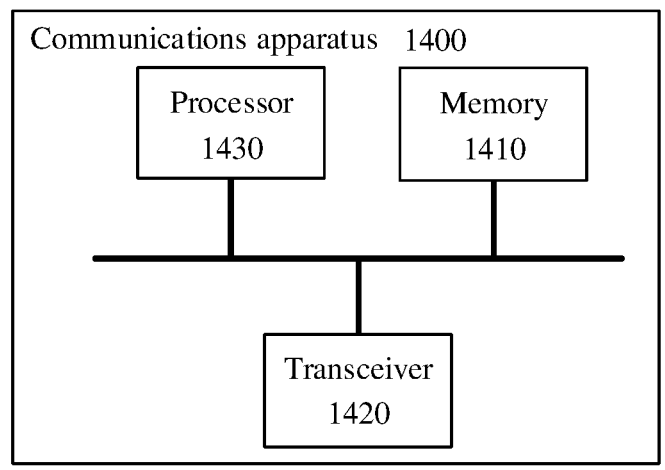
FIG. 14 is a schematic block diagram of a communications apparatus according to this application.

FIG. 14 is a schematic block diagram of a communications apparatus 1400 according to this application. The communications apparatus 1400 includes a memory 1410 configured to store a program, where the program includes code, a transceiver 1420 configured to communicate with another device, and a processor 1430 configured to execute the program code in the memory 1410.

Optionally, when the code is executed, the processor 1430 may implement operations in the wireless communication method 200, the wireless communication method 300, the wireless communication method 400, the wireless communication method 500, or the wireless communication method 600. For brevity, details are not described herein again. In this case, the communications apparatus 1400 may be a network device or a terminal device. The transceiver 1420 is configured to perform specific signal transmitting and receiving while driven by the processor 1430. The communications apparatus 1400, network device, terminal device, transceiver, and processor may all comprise hardware.

A person of ordinary skill in the art may be aware that, in combination with the examples described in the embodiments disclosed in this specification, units and algorithm steps may be implemented using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present disclosure essentially, or the part contributing to other approaches, or some of the technical solutions may be implemented in a form of a software product. The computer software product is stored in a hardware storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc. The foregoing storage medium of a universal serial bus (USB) flash drive, a removable hard disk, a read-only memory (ROM), a random access memory (RAM), a magnetic disk, or an optical disc may all comprise hardware.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. All such manner of connectivity may comprise coupled or coupling. The computer readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium, a semiconductor medium (for example, a solid state disk (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless communication method implemented by a standby policy and charging control (PCC) function device, the wireless communication method comprising:
  receiving an authentication authorization request (AAR) message from an application function (AF);
  determining that an Internet Protocol (IP)-connectivity access network (CAN) session corresponding to the AAR message does not exist among session information stored on the standby PCC function device;
  obtaining, from a standby subscription profile repository based on an IP address carried in the AAR message, IP-CAN session information corresponding to the AAR message after determining that the IP-CAN session is not stored on the standby PCC function device;
  identifying the AAR message as a service update message for a session associated with the AF;
  obtaining from the standby subscription profile repository based on the IP address, application-level session information corresponding to the service update message; and
  using the application-level session information to update and release the session associated with the AF.

2. The wireless communication method of claim 1, wherein before obtaining the IP-CAN session information, the wireless communication method further comprises obtaining, from the standby subscription profile repository, a first status of a first link between an active PCC function device and the standby PCC function device.

3. The wireless communication method of claim 1, further comprising:
  obtaining, from the standby subscription profile repository, subscription information of a user equipment corresponding to the IP address;
  determining a quality of service (QoS) control rule based on the AAR message and the subscription information;
  determining a policy and charging enforcement function (PCEF) device based on the IP-CAN session information; and
  sending a user re-authentication/re-authorization (RAR) message to the policy and charging enforcement function device, wherein the RAR message instructs the policy and charging enforcement function device to establish a dedicated bearer based on contents of the user RAR message, and wherein the contents of the user RAR message comprise the QoS control rule and an identifier of the standby PCC function device.

4. The wireless communication method of claim 1, wherein before obtaining the IP-CAN session information, the wireless communication method further comprises determining that a first link between an active PCC function device and the standby PCC function device is abnormal or a second link between the active PCC function device and a policy and charging enforcement function device is abnormal.

5. The wireless communication method of claim 4, wherein before determining that the first link is abnormal or the second link is abnormal, the wireless communication method further comprises establishing a diameter link between the standby PCC function device and the active PCC function device.

6. The wireless communication method of claim 2, wherein before obtaining the IP-CAN session information, the wireless communication method further comprises obtaining, from the standby subscription profile repository, a second status of a second link between the active PCC function device and a policy and charging enforcement function device.

7. The wireless communication method of claim 6, further comprising determining whether the first link is abnormal and/or the second link is abnormal based on the first status and/or the second status, respectively.

8. The wireless communication method of claim 7, further comprising sending the AAR message to the active PCC function when the standby PCC function device determines that the first link is normal and the second link is normal based on the first status and/or the second status, respectively.

9. The wireless communication method of claim 8, wherein the standby PCC function device sends the AAR message to the active PCC function device.

10. The wireless communication method of claim 4, further comprising obtaining the IP-CAN session information from the standby subscription profile repository when the first link is abnormal and/or the second link is abnormal, thereby avoiding re-establishment of the IP-CAN session by the standby PCC function device.

11. The wireless communication method of claim 9, wherein the AAR message instructs the active PCC function to send a re-authentication/re-authorization (RAR) message to the policy and charging enforcement function device.

12. A wireless communication method implemented by an active policy and charging control (PCC) function device, the wireless communication method comprising:
    establishing an application-level session or an internet protocol (IP)-connectivity access network (CAN) session corresponding to a user equipment;
    storing application-level session information or IP-CAN session information in an active subscription profile repository;
    receiving an authentication authorization request (AAR) message from a standby PCC function device;
    obtaining, from the active subscription profile repository, subscription information of the user equipment based on a user IP address carried in the AAR message;
    determining a quality of service (QoS) control rule based on the AAR message and the subscription information of the user equipment;
    determining a policy and charging enforcement function device based on the user IP-CAN session; and
    sending a re-authentication/re-authorization (RAR) message to the policy and charging enforcement function device, wherein the RAR message includes the QoS control rule, and wherein the RAR message instructs the policy and charging enforcement function device to establish a dedicated bearer for the user equipment based on the QoS control rule.

13. The wireless communication method of claim 12, wherein the AAR message further carries an application identifier, a media type, a media stream status, and an IP multimedia subsystem application layer charging identifier.

14. A standby policy and charging control (PCC) function device, comprising:
    a receiver configured to receive an authentication authorization request (AAR) message from an application function (AF); and
    a processor coupled to the receiver and configured to:
        determine that an Internet Protocol (IP)-connectivity access network (CAN) session corresponding to the AAR message does not exist among session information stored on the standby PCC function device;
        obtain, from a standby subscription profile repository based on an IP address carried in the AAR message, IP-CAN session information corresponding to the AAR message after determining that the IP-CAN session is not stored on the standby PCC function device;
        identify the AAR message as a service update message for a session associated with the AF;
        obtain, from the standby subscription profile repository based on the IP address, application-level session information corresponding to the service update message; and
        use the application-level session information to update and release the session associated with the AF.

15. The standby PCC function device of claim 14, wherein before obtaining the IP-CAN session information, the processor is further configured to obtain, from the standby subscription profile repository, a first status of a first link between an active PCC function device and the standby PCC function device.

16. The standby PCC function device of claim 14, further comprising a transmitter coupled to the processor, wherein after obtaining the IP-CAN session information, the processor is further configured to:
    obtain, from the standby subscription profile repository, subscription information of a user equipment corresponding to the IP address;
    determine a quality of service (QoS) control rule based on the AAR message and the subscription information; and
    determine a policy and charging enforcement function device based on the IP-CAN session information,
    wherein the transmitter is configured to send a user re-authentication/re-authorization (RAR) message to the policy and charging enforcement function device, wherein the user RAR message comprises the QoS control rule and an identifier of the standby PCC function device.

17. The standby PCC function device of claim 14, wherein before obtaining the IP-CAN session information, the processor is further configured to determine that a first link between an active PCC function device and the standby PCC function device is abnormal or a second link between the active PCC function device and a policy and charging enforcement function is abnormal.

18. The standby PCC function device of claim 17, wherein before determining that the first link is abnormal or the second link is abnormal, the processor is further configured to establish a diameter link between the standby PCC function device and the active PCC function device.

* * * * *

UNITED STATES PATENT AND TRADEMARK OFFICE
CERTIFICATE OF CORRECTION

PATENT NO. : 11,223,492 B2
APPLICATION NO. : 16/710206
DATED : January 11, 2022
INVENTOR(S) : Ming Yang et al.

Page 1 of 1

It is certified that error appears in the above-identified patent and that said Letters Patent is hereby corrected as shown below:

In the Claims

Claim 3, Column 16, Line 54: "(PCEF) device based" should read "device based"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*